USO10671375B1

United States Patent
Koeppel

(10) Patent No.: US 10,671,375 B1
(45) Date of Patent: Jun. 2, 2020

(54) TOKENIZED MOBILE DEVICE UPDATE SYSTEMS AND METHODS

(71) Applicant: CAPITAL ONE SERVICES, LLC, McLean, VA (US)

(72) Inventor: Adam Koeppel, Washington, DC (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/449,289

(22) Filed: Jun. 21, 2019

Related U.S. Application Data

(62) Division of application No. 16/186,457, filed on Nov. 9, 2018, now Pat. No. 10,372,440.

(51) Int. Cl.
| | |
|---|---|
| *H04L 29/06* | (2006.01) |
| *H04L 9/08* | (2006.01) |
| *H04W 12/08* | (2009.01) |
| *G06F 8/65* | (2018.01) |
| *H04W 4/80* | (2018.01) |
| *H04W 76/10* | (2018.01) |
| *G06F 8/61* | (2018.01) |

(52) U.S. Cl.
CPC ............... *G06F 8/65* (2013.01); *H04L 9/083* (2013.01); *H04L 63/0428* (2013.01); *H04L 63/102* (2013.01); *H04W 12/08* (2013.01); *G06F 8/62* (2013.01); *H04L 63/083* (2013.01); *H04W 4/80* (2018.02); *H04W 76/10* (2018.02)

(58) Field of Classification Search
None
See application file for complete search history.

(56) References Cited

U.S. PATENT DOCUMENTS

| | | | |
|---|---|---|---|
| 6,005,942 A | 12/1999 | Chan | |
| 8,584,225 B1 * | 11/2013 | Kennedy | H04L 67/34 726/10 |
| 9,477,825 B1 * | 10/2016 | Sinchak | G06F 21/6218 |
| 9,542,172 B2 * | 1/2017 | Alsina | G06F 8/65 |

(Continued)

FOREIGN PATENT DOCUMENTS

EP   2 988 470 A1   2/2016

OTHER PUBLICATIONS

Extended European Search Report dated Mar. 16, 2020, issued in corresponding Application No. 19208365.7-1218 (9 pp.).

*Primary Examiner* — Isaac T Tecklu
(74) *Attorney, Agent, or Firm* — Finnegan, Henderson, Farabow, Garrett & Dunner, LLP

(57) ABSTRACT

Systems and methods are provided for managing mobile device updates. In some embodiments, the disclosed systems can include a key provisioning system, a key system, and mobile devices. The key provisioning system can provide keys to the mobile devices and the key system. The key system can receive a key from the key provisioning system, receive a request from an application system, calculate a first token, and provide the first token to the application system for transmission to a mobile device. The mobile device can receive a key from the key provisioning system, establish a local connection with a connected device, receive an application and the first token from the connected device, generate a second token using the application and the key, compare the first token and the second token, and update the mobile device according to the application based on a result of the comparison.

19 Claims, 6 Drawing Sheets

(56) References Cited

U.S. PATENT DOCUMENTS

| | | | |
|---|---|---|---|
| 10,028,117 B1* | 7/2018 | Ben Haim | H04W 8/245 |
| 2007/0208829 A1* | 9/2007 | Kim | G06F 8/61 |
| | | | 709/219 |
| 2008/0016368 A1* | 1/2008 | Adams | H04L 63/0853 |
| | | | 713/183 |
| 2008/0016537 A1* | 1/2008 | Little | H04L 63/0853 |
| | | | 725/81 |
| 2014/0095874 A1* | 4/2014 | Desai | H04L 63/0815 |
| | | | 713/168 |
| 2014/0098671 A1* | 4/2014 | Raleigh | H04L 69/14 |
| | | | 370/235 |
| 2014/0122329 A1* | 5/2014 | Naggar | G06Q 20/3552 |
| | | | 705/41 |
| 2014/0149742 A1* | 5/2014 | Yau | H04L 63/083 |
| | | | 713/159 |
| 2014/0189781 A1* | 7/2014 | Manickam | H04L 67/34 |
| | | | 726/1 |
| 2014/0281506 A1* | 9/2014 | Redberg | H04L 63/067 |
| | | | 713/159 |
| 2014/0281539 A1* | 9/2014 | Faltyn | H04L 63/08 |
| | | | 713/168 |
| 2015/0100788 A1* | 4/2015 | Chastain | H04L 63/0807 |
| | | | 713/169 |
| 2015/0319158 A1* | 11/2015 | Kumnick | H04L 67/02 |
| | | | 726/9 |
| 2016/0014123 A1 | 1/2016 | Shin et al. | |
| 2016/0028550 A1* | 1/2016 | Gaddam | H04L 9/3263 |
| | | | 713/173 |
| 2016/0057619 A1 | 2/2016 | Lopez | |
| 2016/0092696 A1* | 3/2016 | Guglani | G06F 21/335 |
| | | | 726/26 |
| 2016/0125402 A1* | 5/2016 | Lee | G06Q 20/3825 |
| | | | 705/67 |
| 2016/0188317 A1* | 6/2016 | Hilliar | G06F 8/65 |
| | | | 717/172 |
| 2016/0205169 A1* | 7/2016 | Koum | H04L 67/025 |
| | | | 709/206 |
| 2016/0261411 A1* | 9/2016 | Yau | H04L 63/0807 |
| 2017/0243417 A1* | 8/2017 | Manikantan Shila | H04W 12/06 |
| 2018/0006821 A1* | 1/2018 | Kinagi | H04L 9/3213 |
| 2018/0070199 A1* | 3/2018 | Buck | H04W 4/80 |
| 2018/0146369 A1* | 5/2018 | Kennedy, Jr. | H04W 12/06 |
| 2018/0288030 A1* | 10/2018 | Witrisna | H04L 63/0807 |
| 2019/0019185 A1* | 1/2019 | Chitalia | G06Q 20/38215 |

\* cited by examiner

TOKENIZED MOBILE DEVICE UPDATE SYSTEMS AND METHODS

RELATED APPLICATIONS

This application is a divisional of application Ser. No. 16/186,457, filed Nov. 9, 2018, currently pending, the content of which is expressly incorporated herein by reference in its entirety.

TECHNICAL FIELD

The disclosed embodiments concern mobile devices. In particular, the disclosed embodiments concern an architecture enabling a mobile device to securely receive applications, such as applets and firmware updates, without having to connect directly to an application system.

BACKGROUND

Mobile devices may benefit from installing new applications, such as firmware updates or applications providing new functionality, after delivery to end users. But such mobile devices may lack the necessary hardware and/or software to communicate directly with application systems capable of providing such new applications. However, these mobile devices may be able to at least intermittently access devices that may, in turn, be able to connect to the application systems. Because the mobile devices are connecting through another device, however, there must be some way to ensure that the new applications provided have not been modified or altered.

Accordingly, a need exists for systems and methods that enable a mobile device to securely receive applications, such as applets and firmware updates, without having to connect directly to an application system.

SUMMARY

The disclosed embodiments enable a mobile device to securely receive applications, such as applets and firmware updates, without having to connect directly to an application system. According to the disclosed embodiments, the applications can be provided to a connected device, which can provide the applications to the mobile device.

The disclosed embodiments can include a method for updating a mobile device performed by the mobile device. The method can include a sequence of steps. Such steps can include storing a key received from a key provisioning system. The key can be stored in a secure element of the mobile device. The steps can include establishing a local connection with a connected device. The steps can include receiving an application and a first token from the connected device. The steps can include generating a second token using the application and the key. The steps can include comparing the first token and the second token. The steps can further include updating the mobile device according to the application based on a result of the comparison.

In some aspects, the connected device can be a first smart phone and the mobile device can be a smart watch, a smart card, or a second smart phone. In various aspects, the method can include providing, to the connected device, instructions to retrieve the application from an application system distinct from the key provisioning system. The application can be received in response to providing the instructions to retrieve the application. The method can further include, in some aspects, providing instructions to display an authorization message on the connected device.

Receiving the application and the first token from the connected device can include, in some aspects, decrypting the at least one of the application and the first token. Updating the mobile device according to the application can include, in some aspects, installing, uninstalling, or modifying an applet on the mobile device. In various aspects, the application can include a command. Updating the mobile device according to the application can include executing the command on the mobile device. The first token can include a hash of the application, in some aspects, and the application can include a firmware update. The mobile device can establish the connection, in some aspects, according to a predetermined schedule or in response to a signal received from the connected device.

The disclosed embodiments can include a method for updating a mobile device performed by a connected device. The method can include a sequence of steps. Such steps can include receiving an update request from the mobile device using a local connection. The steps can further include providing the update request to an application system using a second connection distinct from the local connection. The steps can also include receiving a message from the application system using the second connection in response to the update request. The steps can also include providing the message to the mobile device over the local connection.

The local connection can be established, in some aspects, over a local area network, a personal area network, or a near field communication network. The second connection can be established over a cellular network in various aspects. The method can further include at least one of receiving user authorization before providing the update request to the application system or receiving user authorization before providing the message to the mobile device. The method can further include providing a graphical user interface for managing updates to the mobile device. The graphical user interface can enable the user to authorize at least one of providing the update request to the application system or providing the message to the mobile device. Providing authorizing can include entering at least one of a PIN or password of the user.

The update request can be received in a first communication session with the mobile device in some aspects. The message can be provided to the mobile device in a second communication session, in some aspects, with the mobile device distinct from the first communication session. The method can further include contacting the mobile device to establish the second communication session with the mobile device. Receiving the message from the application system can include receiving an encrypted message from the application system and decrypting the encrypted message to generate the message. The message can be encrypted with a key of the mobile device. The message can include an application for updating the mobile device and a token.

The disclosed embodiments can include a system for managing mobile device updates. The system can include a key provisioning system. The key provisioning system can include a first processor and a first memory storing first instructions. When executed by the first processor, the first instructions can cause the key provisioning system to perform first operations. The operations can include providing a key to a mobile device and to a key system. The key system can include a second processor and a second memory storing second instructions. When executed by the second processor, the second instructions can cause the key system to perform second operations. The second operations can include receiving the key from the key provisioning system. The second operations can further include receiving a request from an application system. The request can include an application. The second operations can include calculating a first token using the key and the application and providing the first token to the application system. The mobile device can include a third processor and a third memory storing third instructions. When executed by the third processor, the third instructions can cause the mobile device to perform third operations. The third operations can include receiving the key from the key provisioning system. The third operations can include establishing a local connection with a connected device. The third operations can further include receiving the application and the first token from the connected device. The third operations can also include generating a second token using the application and the key. The third operations can additionally include comparing the first token and the second token and updating the mobile device according to the application based on a result of the comparison.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts.

Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

Figure 1:
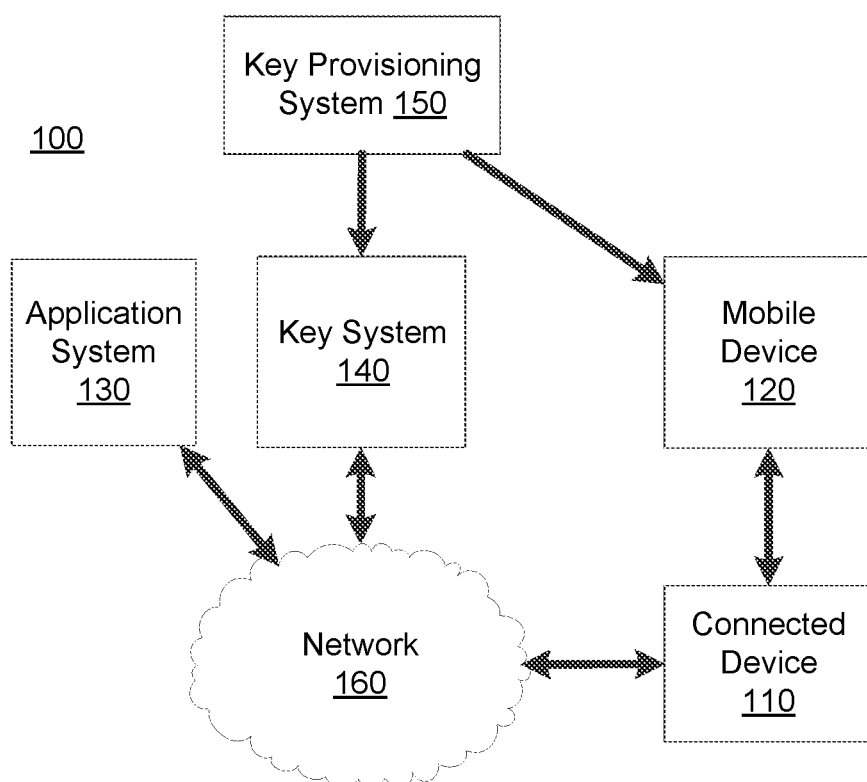
FIG. 1 depicts a schematic of an exemplary system for updating a mobile device.

FIG. 1 depicts a schematic of an exemplary system 100 for updating a mobile device, consistent with disclosed embodiments. System 100 can include connected device 110, mobile device 120, application system 130, key system 140, key provisioning system 150. Connected device 110, application system 130, and key system 140 can be configured to communicate using network 160. Key provisioning system 150 can be configured to provision key system 140 and mobile device 120 with a key (e.g., a cryptographic key or secret).

Connected Device 110 can be a computing device capable of communicating with application system 130 and mobile device 120, consistent with disclosed embodiments. For example, connected device 110 can be a desktop, laptop, tablet, mobile phone, or wearable device. In some embodiments, connected device 110 can possess ethernet, cellular and/or wireless connection capabilities. In various embodiments, connected device 110 can possess radio wave (e.g., Bluetooth, Z-Wave, Zigbee, RFID), infrared, or induction-based communication capabilities. In some embodiments, connected device 110 can be configured to act as a data buffer for mobile device 120. For example, connected device 110 can be configured to retrieve updates intended for mobile device 120 over network 160. Connected device 110 can be configured to store such updates until the next time that mobile device 120 communicates with connected device 110.

Mobile device 120 can be a computing device capable of communicating with connected device 110, consistent with disclosed embodiments. For example, mobile device 120 can be a tablet, smart phone, smart card, wearable device (e.g., a smart watch), Internet of Things device (e.g., a home automation device, virtual assistant, vehicle), or the like. In some embodiments, mobile device 120 can possess radio wave (e.g., Bluetooth, Z-Wave, Zigbee, RFID), infrared, or induction-based communication capabilities sufficient for communication with connected device 110. In some embodiments, mobile device 120 can be a less capable computing device than connected device 110. For example, mobile device 120 can be inferior to connected device 110 in one or more of processing power (e.g., number of processors, speed of processors, architecture of processors, etc.), memory (e.g., amount of memory, speed of memory, type of memory, etc.), power supply (e.g., reliance on battery power, relative battery capacity, etc.), input/output devices (presence of display, keyboard, mouse, touchscreen, etc.).

In some embodiments, mobile device 120 can be unable to communicate with application system 130 over network 160. For example, mobile device 120 can lack hardware and/or software necessary for connecting with application system 130 over network 160. For example, connecting with application system 130 over network 160 may require ethernet, cellular and/or wireless connection capabilities. Mobile device 120 may lack these capabilities. As an additional example, mobile device 120 can lack security capabilities, such as certificates or credentials, for independently communicating with application system 130 over network 160.

Mobile device 120 can be able to establish at least an intermittent connection with connected device 110, consistent with disclosed embodiments. For example, mobile device 120 can be able to establish a connection with connected device 110 when placed in proximity to connected device 110. In some aspects, mobile device 120 and connected device 110 can be configured to automatically establish a connection when placed in proximity. In various aspects, at least one of mobile device 120 or connected device 110 can require additional instructions to establish a connection after being placed in proximity. A connection can be established using radio wave (e.g., Bluetooth, Z-Wave, Zigbee, RFID), infrared, or induction-based communication capabilities. As an additional example, mobile device 120 may only attempt to establish an intermittent connection with connected device 110 (e.g., to preserve battery life), or may only be only be intermittently powered on.

Mobile device 120 can receive a key from key provisioning system 150, consistent with disclosed embodiments. In some embodiments, mobile device 120 can be provisioned with a key during manufacturing. In various aspects, mobile device 120 can be provisioned with a key after manufacturing. For example, a user of mobile device 120 can communicate with key provisioning system 150 directly or through another device (e.g., through connected device 110) to receive a key. Mobile device 120 can be configured with a secure element. This secure element can be configured to perform cryptographic operations for mobile device 120. As a non-limiting example, the secure element can be an Europay MasterCard Visa (EMV) chip, an embedded secure element (eSE), or a secure cryptoprocessor (e.g., a hardware and/or software element conforming at least in part to ISO/IEC 11889—Trusted Platform Module). The secure element can be configured to store the key provided by key provisioning system 150.

Application System 130 may comprise one or more computing systems, such as workstations or servers, configured to perform operations consistent with disclosed embodiments. Application System 130 may be standalone, or it may be part of a subsystem, which may be part of a larger system. For example, this larger system can include distributed servers, network components, and user devices that are remotely located and communicate over a network (e.g., private network 160) or a dedicated network, such as a LAN, for an entity. In certain embodiments, application system 130 may be configured to provide software (e.g., applications, patches, firmware updates, etc.) for download. As described in greater detail below, application system 130 can be configured to interact with key system 140 and connected device 110 to provide this software.

Key system 140 may comprise one or more computing systems, such as workstations or servers, configured to perform operations consistent with disclosed embodiments. Key system 140 may be standalone, or it may be part of a subsystem, which may be part of a larger system. For example, this larger system can include distributed servers, network components, and user devices that are remotely located and communicate over a network (e.g., private network 160) or a dedicated network, such as a LAN, for an entity. In certain embodiments, key system 140 may be configured to manage software authentication for system 100. For example, key system 140 can be configured to receive one or more keys from key provisioning system 150. The keys may correspond to mobile devices (e.g., mobile device 120). Key system 140 can be configured to store these corresponding keys. In response to a request from application system 130, key system 140 can be configured to generate a token for use in authenticating a software download. Key system 140 can be configured to generate the token using one of the stored keys. In some aspects, key system 140 can be configured to provide the token to application system 130. In various aspects, key system 140 can be configured to provide the token to mobile system 120.

Key provisioning system 150 may comprise one or more computing systems, such as workstations or servers, configured to perform operations consistent with disclosed embodiments. Key provisioning system 150 may be standalone, or it may be part of a subsystem, which may be part of a larger system. For example, this larger system can include distributed servers, network components, and user devices that are remotely located and communicate over a network (e.g., private network 160) or a dedicated network, such as a LAN, for an entity. Key provisioning system 150 can be configured to generate keys for use by system 100. As a non-limiting example, keys generated by key provisioning system 150 can include public/private key pairs (e.g., RSA key pairs) or keys for use with keyed hash algorithms (e.g., HMAC using MD5 of SHA1).

Key provisioning system 150 can be configured to distribute keys to mobile devices (e.g., mobile device 120), consistent with disclosed embodiments. In some embodiments, key provisioning system 150 can be configured to generate public key-private key pairs and to distribute the private keys to the mobile devices. Key provisioning system 150 can be configured, in some aspects, to distribute the keys to the mobile devices prior to delivery of the mobile devices to the end users. For example, key provisioning system 150 can be configured to distribute the keys to the mobile devices during manufacturing of the mobile devices. As an additional example, key provisioning system 150 can be configured to distribute the keys to the mobile devices after manufacturing of the mobile devices. For example, in some embodiments a user of a mobile device can interact with the mobile device to obtain a key from key provisioning system 150.

Key provisioning system 150 can be configured to distribute keys to key system 140, consistent with disclosed embodiments. For example, key provisioning system 150 can be configured to provide keys to key system 140 using network 160, or another network (e.g., a local area network connecting key provisioning system 150 and key server 140 and/or mobile device 120).

Key provisioning system 150 can be configured to provide the same keys to both key system 140 and the mobile devices, consistent with disclosed embodiments. For example, key provisioning system 150 can be configured to provide a key to both mobile device 120 and key system 140. Key provisioning system 150 can additionally or alternatively be configured to provide complementary keys to key system 140 and the mobile devices. For example, key provisioning system 150 can be configured to provide the public key in a public key/private key pair to key system 140, while providing the private key in the public key/ private key pair to the mobile device. Key provisioning system 150 can be configured to provide keys to mobile devices before, after, or when providing keys to key system 140.

Network 160 can include any type of network (including infrastructure) that provides communications, exchanges information, and/or facilitates the exchange of information, consistent with disclosed embodiments. For example, private network 110 can include one or more Local Area Networks, Wide Area Networks, or cellular networks.

Figure 2:
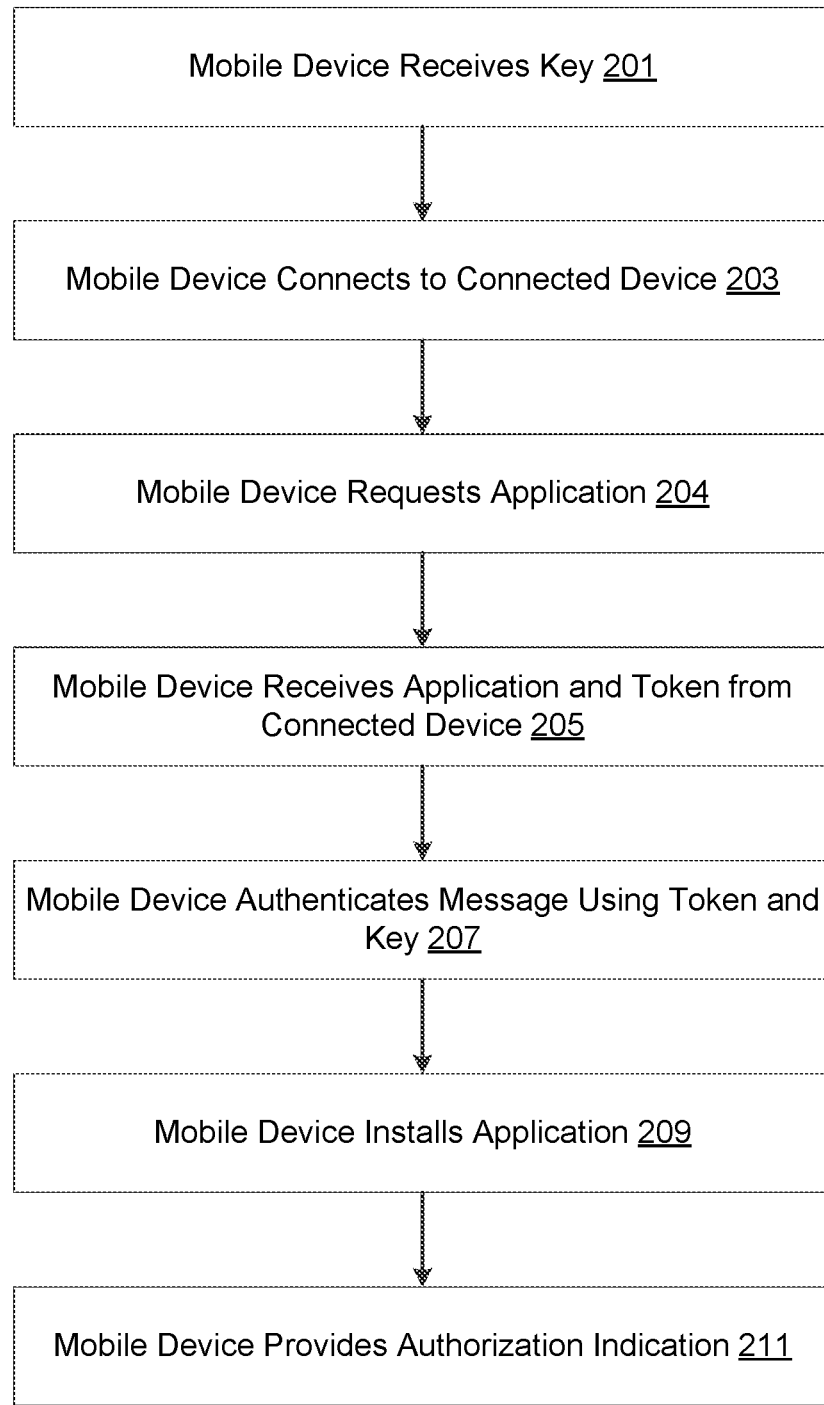
FIG. 2 depicts a flowchart illustrating operations performed by a mobile device according to an exemplary method of updating the mobile device.

FIG. 2 depicts a flowchart illustrating operations performed by mobile device 120 according to an exemplary method 200 of updating mobile device 120, consistent with disclosed embodiments. Method 200 can include the steps of receiving a key, connecting to connected device 110, requesting an application, receiving an application and a token, authenticating message using a token and key, installing the application, and providing an indication of authorized installation. This sequence of steps is not intended to be limiting. Method 200 can include additional steps, the order of steps may be altered, and/or steps may be removed or combined. In some embodiments, the order of the steps can differ from the order depicted in FIG. 2. For example, mobile device 120 can be configured to connect to mobile device prior to receiving the key. As an additional example, mobile device 120 can be configured to provide an authorization indication before installing the application. In various embodiments, steps can be omitted, combined, or added. For example, method 200 may not include the steps of requesting an application or providing an authorization indication. In this manner, method 200 can enable mobile device 120 to securely receive applications from application system 140, even when mobile device 120 cannot communicate directly with application system 140 over network 160.

After starting method 200, method 200 can proceed to step 201. In step 201, mobile device 120 can receive a key, consistent with disclosed embodiments. In some embodiments, mobile device 120 can be configured to receive the key from key provisioning system 150. Mobile device 120 can be configured to store the key in a secure element of mobile device 120 (e.g. an EMV chip, embedded secure element, or cryptographic coprocessor). In some embodiments, the key can be stored in the secure element during manufacturing of mobile device 120, before to delivery of mobile device 120 to the user, or in response to interactions with the user.

After step 201, method 200 can proceed to step 203. In step 203, mobile device 210 can connect to connected device 110, consistent with disclosed embodiments. Mobile device 210 can, in some embodiments, be configured to establish a local connection with connected device 110. In some aspects, the local connection can be established over a wired channel (e.g., a USB connection or similar connection), a radio channel (e.g., a Bluetooth, Zigbee, Z-wave, or similar connection), an infrared channel, or a near-field channel (e.g., a contactless payment system, a smart card reader, or a similar connection). These examples are not intended to be limiting. In some aspects, the connection can be established over a local area network. In some embodiments, mobile device 120 can be configured to establish the local connection according to a predetermined schedule. For example, mobile device 120 can be configured to establish the connection hourly, daily, weekly, or at shorter or longer intervals. In this manner, mobile device 120 can conserve battery power. In various aspects, mobile device 120 can be configured to establish the local connection in response to a signal. In various aspects, the signal may be received from the connected device. For example, the connected device can be configured to send a "wake-up" signal to the mobile device. This "wake-up" signal could be provided over the same channel used by mobile device 120 to connect with connected device 110, or another channel. In some aspects, the signal can be provided by the user. For example, the user can interact with mobile device 120 to cause mobile device 120 to establish a connection with connection device 110. As a further example, the user could interact with an interface provided by mobile device 120 (e.g., a graphic user interface or physical buttons or controls). As an additional example, the user could position mobile device 120 to interact with connected device 110 (e.g., by moving mobile device 120 proximate to connected device 110, enabling mobile device 120 to establish the local connection over a near-field channel).

After step 203, method 200 can proceed to step 204. In step 204, mobile device 120 can request an application, consistent with disclosed embodiments. The request can specify, in various embodiments, that connected device 110 provide any updates for mobile device 120 stored on connected device 110. For example, connected device 110 can be configured to automatically download updates from application system 130. Mobile device 120 can be configured to request that connected device 110 provide any such downloaded updates.

The request can specify the application and application system 130 in some embodiments. For example, mobile device 120 can be configured to provide instructions for retrieving the application from application system 130. The instructions can include an identifier for the application and/or location of application system 130 (e.g., a uniform resource locator). The instruction can also include information identifying, authenticating, and/or authorizing mobile device 120 or the user (e.g., a user name and password, a serial number, a media access control address, or similar information).

After step 204, method 200 can proceed to step 205. In step 205, mobile device 120 can receive the requested application from connected device 110, consistent with disclosed embodiments. In some embodiments, step 205 comprises receiving a token from connected device 110. After requesting the application in step 204, mobile device 120 can be configured to additionally request the application and token from connected device 110 (e.g., mobile device 120 can "pull" the application and/or token from connected device 110) in some embodiments. For example, mobile device 120 can be configured to poll connected device 110 for the presence of the application and/or token (e.g., mobile device 120 can be configured to repeatedly contact connected device 110 to check whether connected device 110 can provide the application and token). As an additional example, mobile device 120 can be configured to receive an indication from the connected device that the application and/or token are available for retrieval. Mobile device 120 can be configured provide a request for the application and/or token in response to this indication. In various embodiments, after requesting the application in step 204, mobile device 120 can be configured to receive the application and token from connected device 110 absent any further request for the application and token (e.g., connected device 110 can "push" the application and token to mobile device 120).

The application can comprise instructions for adding, removing, or modifying applets on mobile device 120, consistent with disclosed embodiments. The application can comprise a firmware upgrade for mobile device 120, in some embodiments. At least one of the application or the token can be encrypted. Receiving the application and/or the token from connected device 110 can include decrypting the at least one of the application or the token. For example, the application and/or the token can be received in a single message, which can be encrypted. Mobile device 120 can be configured to decrypt the message to obtain the application and the token. As an additional example, at least some of the application can be encrypted, and mobile device 120 can be configured to decrypt the encrypted portion of the application. As a further example, the token can be encrypted, and mobile device 120 can be configured to decrypt the token. In some aspects, the token can be a hash of the application. For example, the token can be a keyed hash of at least a portion of the application (or a keyed hash of a hash of the application), such as a message authentication code. This message authentication code can be computed using the key for mobile device 120. For example, key system 140 may have computed the hash using the application and the key shared by key provisioning system 150 with key system 140 and mobile device 120. In some aspects, the token can be a hash of the application and additional data, such as a timestamp and/or a nonce. In such aspects, the timestamp and/or nonce may be received with the application and the token. Additionally or alternatively, the timestamp and/or nonce can be derivable by mobile device 120. In various aspects, the token can be a digital signature of the application. This digital signature can be computed using a public key distributed to key system 140 by key provisioning system 150. Mobile device 120 can then verify the signature using a corresponding private key distributed to mobile device 120 by key provisioning system 150. The digital signature cam incorporate a timestamp and/or a nonce, which may be received with the application and the token or may be derivable by mobile device 120.

After step 205, method 200 can proceed to step 207. In step 207, mobile device 120 can authenticate the application using the token and the key, consistent with disclosed embodiments. Mobile device 120 can be configured to generate a second token using the application and the key in some embodiments. When the token received from connected device 120 is the result of computing a keyed hash over a portion of the application (or over a hash of the application), mobile device 120 can be configured to compute a keyed hash over the same portion of the application (or over a hash of the application) using the key received from key provisioning system 150. When the keyed hash was computed over additional information such as a timestamp and/or nonce, in addition to the portion of the application (or hash of the application), mobile device 120 can compute a key hash over this same additional information. As disclosed above, the additional information can either be provided with the application and the token or chosen such that mobile device 120 can derive the additional information. Mobile device 120 can be configured to compare the keyed hash received from connected device 110 to the keyed hash generated by mobile device 120. Mobile device 120 can deem the application authenticated when these keyed hashes match.

When the token received from connected device 120 is the result of computing a digital signature for the application, mobile device 120 can be configured to validate the digital using the key received from key provisioning system 150, consistent with disclosed embodiments. For example, mobile device 120 can decrypt the token using a private key received from key provisioning system 150 into a digest. In some aspects, the digest may have been calculated over the application. In various aspects, the digest may have also been calculated over additional information. Mobile device 120 can calculate a digest over the application (and any additional information). Mobile device 120 can be configured to compare the digest generated by decrypting the token received from connected device 110 to the digest generated by mobile device 120. Mobile device 120 can deem the application authenticated when these digests match.

As part of step 207, in some embodiments, mobile device 120 can be configured to provide instructions to connected device 110 to display a message. Such a message can indicate at least one of the application, a purpose of the application, the application status of the application (e.g., whether or not the application was successfully authenticated). In some aspects, the message can request permission to install the application. In various aspects, mobile device 120 can be configured to provide instructions to display a message requesting additional information before, or as part of, authentication. For example, mobile device 120 can provide instructions to display a request for credentials. Such credentials can include a username and password of the user, a personal identification number, or a code obtained through another channel (e.g., as part of a multi-factor authentication scheme). Connected device 110 can be configured to provide a response to the message to mobile device 120.

In some embodiments, authenticating the application using the token and the key at step 207 comprises performing the authentication via connected device 110 (i.e., a pass-through authentication). For example, at step 207, mobile device 120 may provide the key to the connected device 110; connected device 110 may authenticate the application using the token and the provided key; and mobile device 120 may receive the results of the authentication from connected device 110. In some embodiments, mobile device 120 may receive a request for the key from connected device 120 prior to providing the key to connected device 110. In some embodiments, connected device 110 performs the authentication without the key for mobile device 120, and step 207 comprises receiving the results of the authentication from connected device 110 without receiving a request for the key for mobile device 120.

After step 207, method 200 can proceed to step 209. In step 209, mobile device 120 can install the application, consistent with disclosed embodiments. Mobile device 120 can install the application based on the result of the comparison between the token received from connected device 110 and the token generated by mobile device 120. For example, mobile device 120 can install the application when the keyed hash received from connected device 110 matches the keyed hash generated by mobile device 120. As an additional example, mobile device 120 can install the application when the digest generated from the digital signature received from connected device 110 matches the digest generated by mobile device 120. In some embodiments, updating mobile device 120 according to the application can include installing, uninstalling, or modifying an applet on mobile device 120. In various embodiments, the application can include a command and a payload. For example, the command can specify the action to be performed on mobile device 120. Non-limiting, exemplary commands can include deleting an existing applet, updating an applet, updating firmware of mobile device 120, or installing a new applet. In some embodiments, the applet can be a computer program configured to run on the secure element of mobile device 120. In some aspects, the payload can provide data or parameters used to perform the action. For example, when the command is to install an applet, the payload can include the applet to be installed. In some aspects, updating the mobile device according to the application can include executing the command on the mobile device.

After step 205, method 200 can proceed to step 211. In step 211, mobile device 120 can provide instructions to connected device 110 to display an authentication indication, consistent with disclosed embodiments. For example, mobile device 120 can provide instructions to indicate that the application has been (or has not been) successfully authenticated. As an additional example, mobile device 120 can provide instructions to indicate that the application has been (or has not been) successfully installed.

Figure 3:
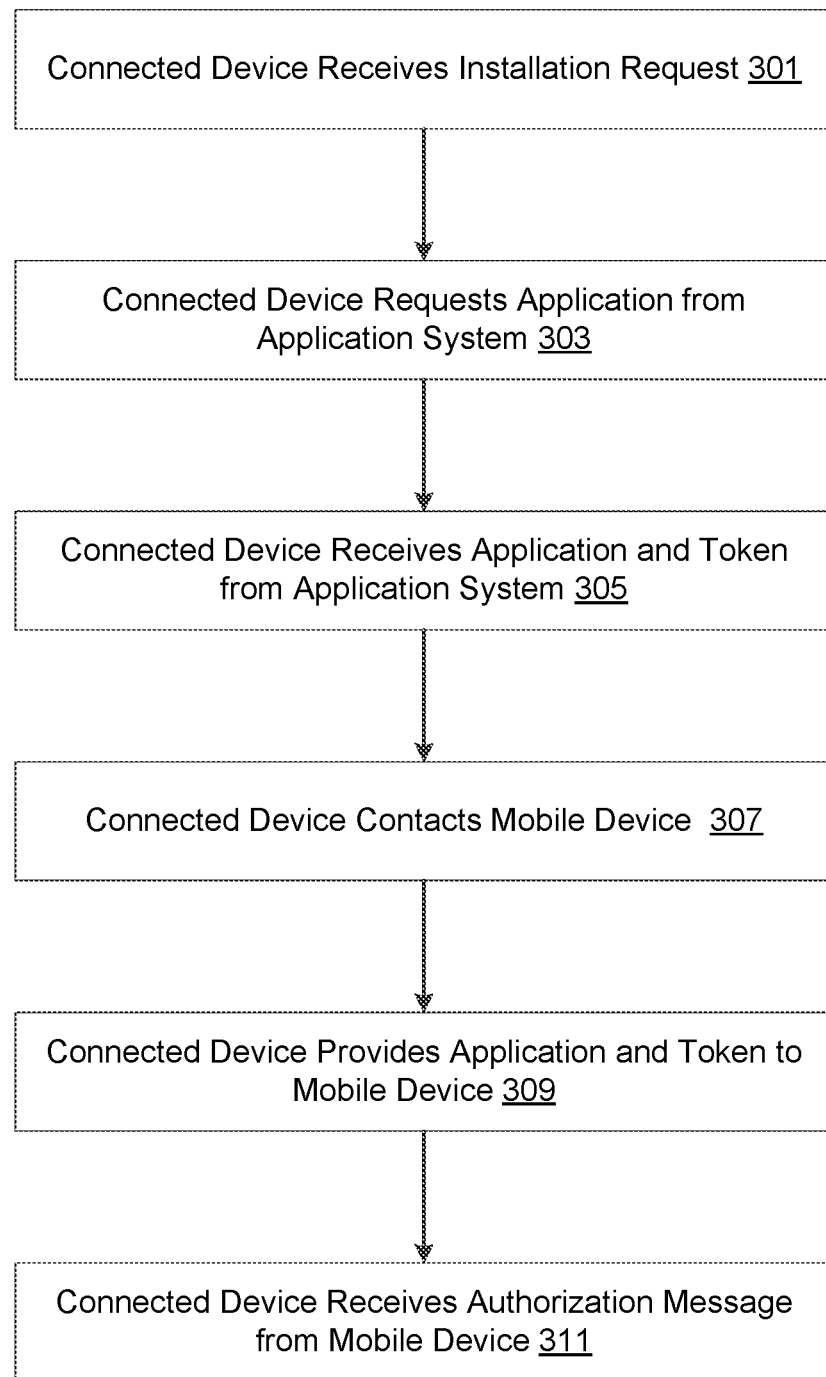
FIG. 3 depicts a flowchart illustrating operations performed by a connected device according to an exemplary method of updating a mobile device.

FIG. 3 depicts a flowchart illustrating operations performed by connected device 110, according to method 300 of updating mobile device 120, consistent with disclosed embodiments. Method 300 can include the steps of receiving an installation request, requesting an application from application system 130, receiving an application and a token, contacting mobile device 120, providing the application and token to mobile device 120, and receiving an authorization message from mobile device 120. This sequence of steps is not intended to be limiting. Method 300 can include additional steps, the order of steps may be altered, and/or steps may be removed or combined. For example, the order of the steps can differ from the order depicted in FIG. 3. For example, connected device 110 can be configured to request the application from application system 140 prior to receiving the request from mobile device 120. In some embodiments, method 300 may not include the step of receiving an installation request from mobile device 120. In various embodiments, method 300 may not include the step of receiving an authorization message from mobile device 120. In this manner, method 300 can enable connected device 110 to convey applications to mobile device 120.

After starting, method 300 can proceed to step 301. In step 301, connected device 110 can receive an installation request from mobile device 120, consistent with disclosed embodiments. The installation request can be an update request in some embodiments. For example, mobile device 120 can request a firmware update or an update to an applet running on a secure element of mobile device 120. Connected device 110 can be configured to receive the request over a local connection. The local connection can be established over a local area network, a personal area network, or a near field communication network. In some aspects, the local connection can include a radio wave (e.g., Bluetooth, Z-Wave, Zigbee, RFID), infrared, or induction-based connection. For example, connected device 110 can be connected to a contactless payment system, which may form a connection with mobile device 120. As an additional example, connected device 110 can be connected to mobile device 120 using a Bluetooth link.

The installation request can include instructions for contacting application system 140, consistent with disclosed embodiments. The instructions can include at least one of an identifier for the application, a location of application system 130 (e.g., a uniform resource locator) or information identifying, authenticating, and/or authorizing mobile device 120 or the user (e.g., a user name and password, a serial number, a media access control address, or similar information) in some embodiments. Connected device 110 can use the location information to contact application system 130. Connected device 110 can provide the information identifying, authenticating, and/or authorizing mobile device 120 to application system 130. In various embodiments, connected device 110 can be configured with the location of application system 130 and may rely on this preconfigured location when requesting an application from application system 130. In some embodiments, connected device 110 can be configured with credential for application system 130 and may rely on these credentials when requesting an application from application system 130.

After step 301, method 300 can proceed to step 303. In step 303, connected device 110 can request an application from application system 130, consistent with disclosed embodiments. The request can include an identifier of the application. For example, the request can include a name of the application, a name of a file for installing the application, a current version of an application executing on mobile device 120, and/or a similar identifier. In some embodiments, connected device 110 can be configured to forward the request to application system 130. In various embodiments, connected device 110 can be configured to generate a new request. For example, connected device 110 can create a new request including credential for connected device 110, rather than credentials for mobile device 120.

As described above, in some embodiments method 300 may not include step 301. In such embodiments, connected device 110 can be configured to repeatedly, intermittently, or periodically request applications from application system 130. For example, connected device 110 can be configured to request firmware updates from application system 130. Alternatively or additionally, application system 130 can be configured to repeatedly, intermittently, or periodically push applications to connected device 110. For example, application system 130 can be configured to push firmware updates to connected device 110 as they become available to application system 130.

Connected device 110 can be configured to request an application from application system 130 over a second connection distinct from the local connection. In some embodiments, the second connection can be established over a network that includes connected device 110, but not mobile device 120 (e.g., network 160). For example, the second connection could be established over a WLAN network that includes as a node connected device 110 but does not include mobile device 120. As an additional example, the second connection could be established over a cellular network accessible to connected device 110, but not accessible to mobile device 120.

In some embodiments, connected device 110 can be configured to request user authorization prior to sending the request to application system 130. For example, connected device 110 can be configured to display a message requesting user authorization before requesting an update for an application on mobile device 120. In some embodiments, the message may require the user to provide credentials, such as a password and username or personal identification number. In various embodiments, connected device 110 can rely on the credentials received from the user when requesting the application from application system 130.

After step 303, method 300 can proceed to step 305. In step 305, connected device 110 can receive an application and a token, consistent with disclosed embodiments. The application can be the application requested by connected device 110 in step 303 or an application pushed out to connected device 110 by application system 130. The application can be received from application system 130. In some embodiments, the token can be received from application system 130. In various embodiments, the token can be received from key system 140. As described above, with regards to method 200, the token can be a keyed hash or digital signature. Connected device 110 can be configured to receive the application and token using a connection established over a network (e.g., network 160) that includes connected device 110, but not mobile device 120.

Step 305 can include receiving an encrypted message from application system 130, consistent with disclosed embodiments. The encrypted message can include the token and/or at least some of the application. In some embodiments, the message can be encrypted with a key associated with connected device 110. For example, the message can be encrypted with a public key of connected device 110. In some embodiments, connected device 110 can be configured to decrypt the message to recover the token and/or the encrypted portion of the application. In some aspects, the encrypted portion of the application can be a command portion or a payload portion do the application. In various aspects, the message can be encrypted with a key associated with the mobile device.

After step 305, method 300 can proceed to step 307. In step 307, connected device 110 can contact mobile device 120, consistent with disclosed embodiments. Connected device 110 can contact mobile device 120 to establish a communication session for providing the application and token in some embodiments. The communication session can be established using the local connection of step 303, or another local connection (e.g., another connection using radio, infrared, induction, or a similarly ranged communication modality). In some aspects, connected device 110 can receive the request for the application from mobile device 120 in a first communication session and provide the application and token in a second, separate communication session distinct from the first communication session. In some embodiments, step 307 includes sending a request for the key for mobile device 120 and receiving, from mobile device 120, the key for mobile device 120 in response to the request.

After step 307, method 300 can proceed to step 309. In step 309, connected device 110 can provide the application and/or token to mobile device 120, consistent with disclosed embodiments. Connected device 110 can be configured to receive user authorization before providing the application and/or token (or an encrypted message containing the token and/or at least some of the application) to mobile device 120 in some embodiments. For example, connected device 110 can be configured to provide a graphical user interface for managing updates to mobile device 120. In some aspects, the graphical user interface can enable the user to authorize providing the message to mobile device 120. For example, the graphical user interface can enable the user to provide credentials for authorizing the message. For example, the user can provide at least one of a PIN or password of the user. Connected device 110 can use the credentials to determine whether the user is authorized to provide the message to mobile device 120. In various embodiments, connected device 110 can be configured to store applications intended for mobile device 120. Connected device 110 can be configured to automatically provide the stored applications to mobile device 120 when mobile device 120 contacts connected device 110.

After step 309, method 300 can proceed to step 311. In step 311, connected device 110 can receive an authorization message from mobile device 120, consistent with disclosed embodiments. The authorization message can indicate the result of the attempted authentication of the application, in some embodiments. For example, mobile device 120 can indicate whether the application was successfully authenticated.

In some embodiments, at step 311, connected device 110 performs the authentication and receive an indication of successful authentication. For example, connected device 110 may perform the authentication using the token and the received key for mobile device 120 (step 307). As another example, connected device 110 may perform the authentication using the token and a key associated with connected device 110.

In some embodiments, connected device 110 can be configured to perform (or allow performance of) an action in response to receiving an indication of successful authentication. For example, connected device 110 can be configured to execute a second application upon receiving an indication that a first application was successfully authenticated by mobile device 110 (or by connected device 110). In this manner, connected device 110 can be configured to perform multi-factor authentication using mobile device 120. In such embodiments, possession of mobile device 120 and establishment of a local connection between connected device 110 and mobile device 120 can be required to perform (or allow performance of) an action by connected device 110. The action by connected device 110 could include updating an application on connected device 110 or completing a transaction using connected device 110. For example, connected device 110 could be mobile phone and mobile device 120 could be a bank card including a secure element. A transaction using the mobile phone could require authentication of an applet retrieved by the mobile phone as part of the transaction. The transaction may not be approved without the authentication provided by the smart card. In this manner, the smart card could serve as a general identity card.

Figure 4:
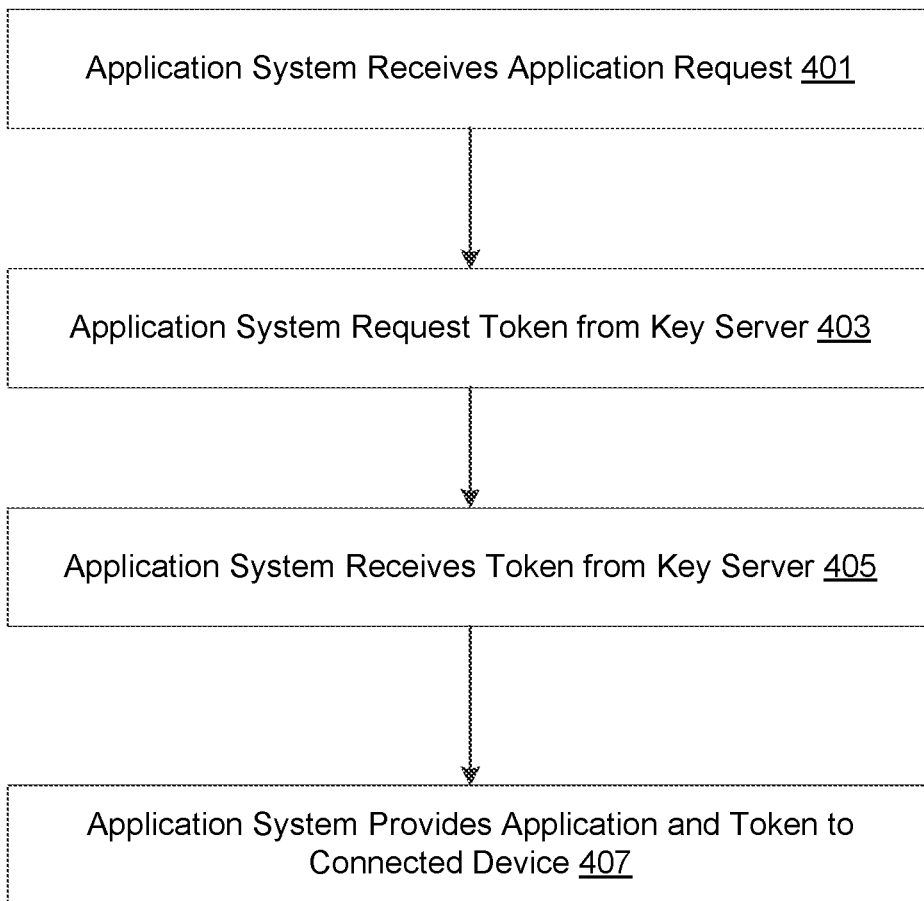
FIG. 4 depicts a flowchart illustrating operations performed by an application system according to an exemplary method of updating a mobile device.

FIG. 4 depicts a flowchart illustrating operations performed by application system 130 according to method 400 of updating mobile device 120. Method 400 can include the steps of receiving an application request, requesting a token from key system 140, receiving a token from key system 140 in response to the token request, and providing the application and token to connected device 110. This sequence of steps is not intended to be limiting. Method 400 can include additional steps, the order of steps may be altered, and/or steps may be removed or combined. For example, in some embodiments application system 130 can be configured to repeatedly, intermittently, or periodically provide applications to connected device 110. For example, application system 130 can be configured to provide firmware updates to connected device 110 as they become available. As an additional example, key system 140 may provide the token to connected device 110 in place of application system 130.

After starting, method 400 can proceed to step 401. In step 401, application system 130 can receive an application request from connected device 110, consistent with disclosed embodiments. The application request can include credentials for mobile device 120 and/or connected device 110. The application request can identify mobile device 120. In some embodiments, application system 130 can be configured to authenticate the request based on the received credentials. As described above, the request can indicate the application.

After step 401, method 400 can proceed to step 403. In step 403, application system 130 can be configured to provide a request for creation of a token from key system 140. In some embodiments, the creation request can include at least some of the application. For example, when the application includes a command and a payload, the creation request can include at least one of the command or payload. In some embodiments, additional information for computing the token, such as a timestamp and/or nonce, can be provided in the request. In various embodiments, the creation request can include a hash of the application. In such embodiments, the application may not be shared with key system 140. The hash can be calculated over additional information such as a timestamp and/or nonce. In various embodiments, the creation request can include credentials for at least one of application system 130, connected device 110, or mobile device 120. In some embodiments, the creation request can identify mobile device 120.

After step 403, method 400 can proceed to step 405. In step 405, application system 130 can receive a token from key system 140, consistent with disclosed embodiments. As described above, the token can be a keyed hash or digital signature. In some embodiments, key system 140 can be configured to incorporate additional information into the token, such as a timestamp or nonce. Application system 130 can be configured to receive this additional information from key system 140, together with the token.

After step 405, method 400 can proceed to step 407. In step 407, application system 130 can provide the application and token to connected device 110, consistent with disclosed embodiments. Application system 130 can provide the application and token to connected device 110 using network 160. When the token is calculated using additional information (by application system 130 and/or key server 140), this additional information can be provided to connected device 110.

Figure 5:
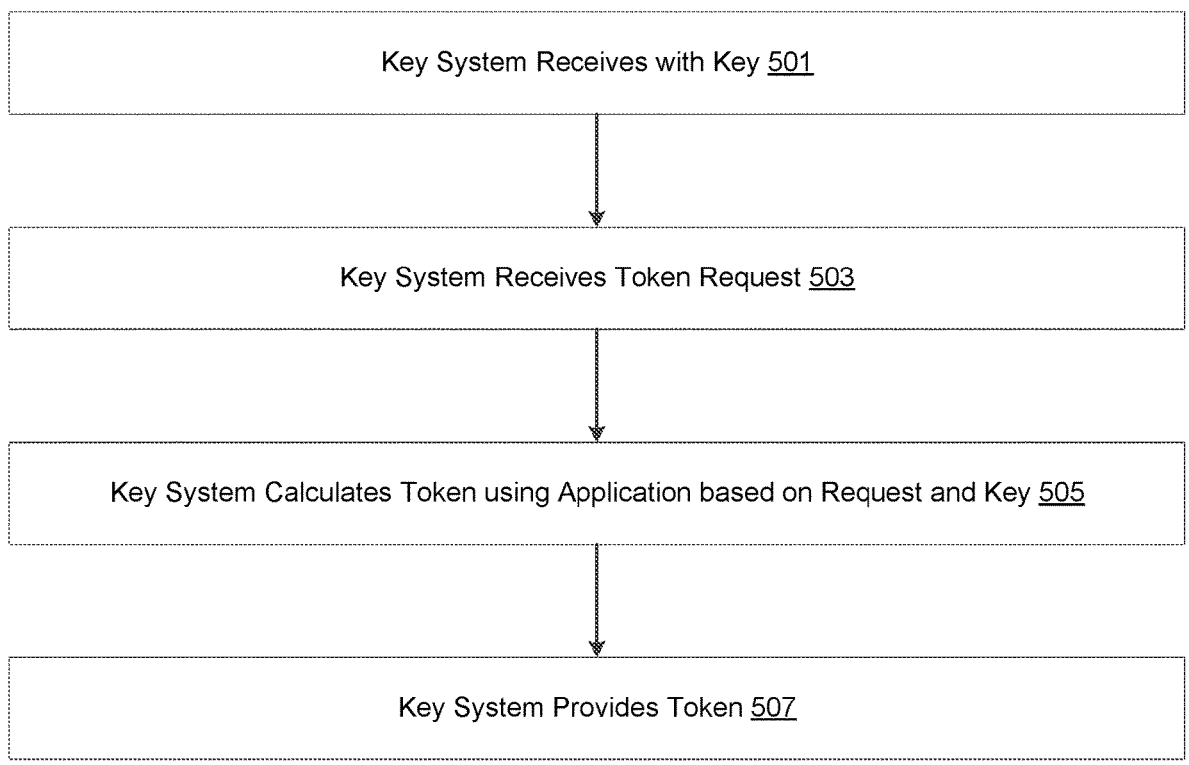
FIG. 5 depicts a flowchart illustrating operations performed by a key system according to an exemplary method of updating a mobile device.

FIG. 5 depicts a flowchart illustrating operations performed by key server 140 according to method 500 of updating a mobile device. Method 500 can include the steps of receiving a key from key provisioning system 150, receiving a token request from application system 130, calculating a token based on the request and the key, and providing the token. This sequence of steps is not intended to be limiting. Method 500 can include additional steps, the order of steps may be altered, and/or steps may be removed or combined. For example, the order of the steps can differ from the order depicted in FIG. 5. In some embodiments, for example, key system 130 can be provisioned with a key following a token request from application system 130.

After starting, method 500 can proceed to step 501. In step 501 key system 140 can receive a key from key provisioning system 150, consistent with disclosed embodiments. The key can correspond to mobile device 120. For example, the key can be a public key corresponding to a private key stored in a secure element of mobile device 120. As an additional example, the key can equal a key stored in a secure element of mobile device 120. Key system 140 can be provisioned with the key by key provisioning system 150. Key provisioning system 150 can provide the key in response to a request from key system 130 or can push the key out to key system 140. Key system 140 and key provisioning system 150 can be configured to communicate using network 160, or another network (e.g., a local area network connecting key provisioning system 150 and key server 140).

After step 501, method 500 can proceed to step 503. In step 503, key system 140 can be configured to receive a token request, consistent with disclosed embodiments. Key system 140 can receive the token request from application system 130. In some embodiments, the token request can include credentials for at least one of mobile device 120, connected device 110, and application system 130. In some embodiments, the token request can include an application (or a hash of an application). In various embodiments, the token request can include additional information, such as a timestamp and/or nonce.

After step 503, method 500 can proceed to step 505. In step 505, key system 140 can generate a token based on the information received in step 503, consistent with disclosed embodiments. For example, key system 140 can be configured to generate the token using the application (or hash of the application) received from application system 130. As an additional example, key system 140 can generate the token using additional information (e.g., a timestamp and/or nonce) received from application system 130 and/or generated by key system 140. In some embodiments, key system 140 can use the key, the application (or hash of the application), and any additional information to generate a keyed hash or a digital signature. In this manner, key system 140 can generate a token using the key. In some embodiments, key system 140 can be configured to validate credentials received from application system 130 (e.g., credentials for application system 130, connected device 110, and/or mobile device 120). Key system 140 may not generate the token unless the received credentials can be validated.

After step 505, method 500 can proceed to step 507. In step 507, key system 140 can provide the token, consistent with disclosed embodiments. Key system 140 can be configured to provide the token to application system 130 in some embodiments. Key system 140 can be configured to provide the token to connected device 110 in various embodiments. Key system 140 can be configured to provide the token using network 160. When key system 140 generates the token using additional information, key system 140 may provide at least some of this additional information together with the token. For example, when key system 140 generates a nonce and calculates the token using the nonce, key system 140 can be configured to provide the nonce together with the token.

Figure 6:
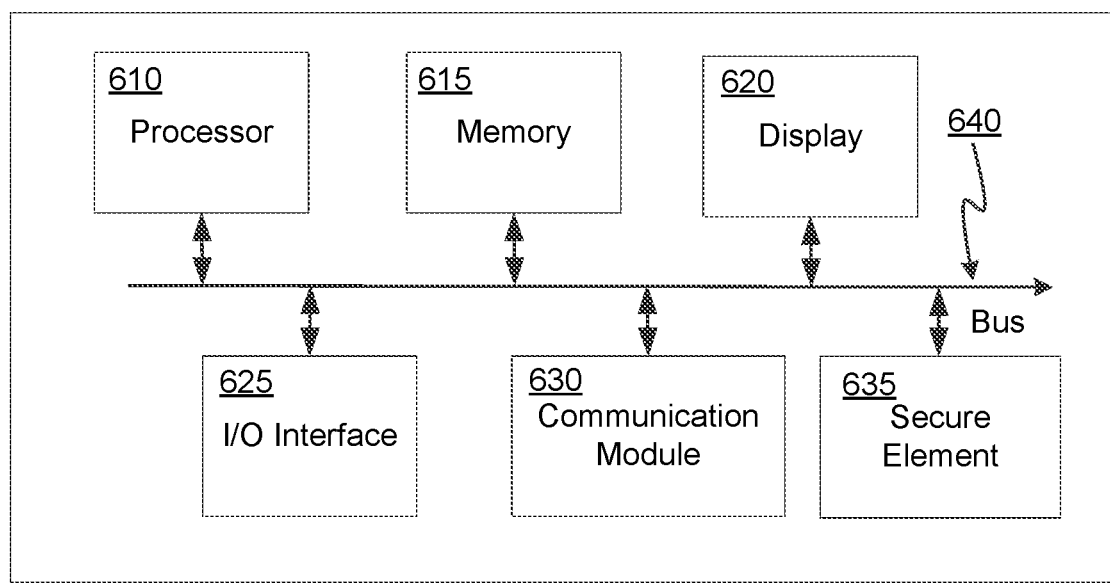
FIG. 6 depicts a schematic illustrating an exemplary computing device for performing the envisioned embodiments.

FIG. 6 depicts a schematic of computing device 600 of system 100, consistent with disclosed embodiments. According to some embodiments, computing device 600 can include a processor 610, memory 615, display 620, I/O interface(s) 625, communication module 630, and secure element 635. These units can communicate with each other via bus 640, or wirelessly. The components shown in FIG. 6 can reside in a single physical device or multiple physical devices.

Processor 610 can be one or more microprocessors, central processing units, or graphics processing units performing various methods in accordance with disclosed embodiments. Memory 615 can include at least one electronic storage device, magnetic storage device, optical storage device, electromagnetic storage device, or semiconductor storage device (e.g., at least one of a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or mechanically encoded device such as punch-cards or raised structures in a groove having instructions recorded thereon). Memory 615 can be configured to store software programs executed by processor 610. Display 620 can comprise one or more of an LED display, LCD display, CRT display, or similar display consistent with disclosed embodiments. I/O interfaces 625 can include keyboard, a mouse, an audio input device, a touch screen, or similar human interface device, consistent with disclosed embodiments. Communications module 630 can enable computing device 600 to exchange information with components of FIG. 1 over network 160 (e.g., enabling connected device 110 to communicate with application system 130 or enabling mobile device 120). In various embodiments, communications module 630 may be configured to support wireless or wired networks. In certain aspects, communications module 630 may be configured with modules for supporting one or more local area networks, personal area networks, Bluetooth networks, RFID networks, and near field networks (e.g., near field communication networks used in contactless payment applications). Secure element 635 can include a secure input/output layer, a secure processor, a non-volatile memory, and a volatile memory. For example, the secure element can be a trusted platform module (e.g., a cryptographic coprocessor conforming at least in part to ISO/IEC 11889), an EMV chip, an embedded secure element, or other secure element. As would be recognized by one of skill in the art, in some embodiments, electronic device 600 may include some or all of the components listed in FIG. 6.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A method for updating a mobile device performed by a connected device, comprising:
    receiving, by the connected device, an update request in a first communication session with the mobile device using a local connection established over a local area network, a personal area network, or a near field communication network;
    providing, by the connected device, the update request to an application system using a second connection established over a cellular network and distinct from the local connection;
    receiving, by the connected device, a message from the application system using the second connection in response to the update request, the message comprising an application for updating the mobile device and a token; and
    providing, by the connected device, the message in a second communication session with the mobile device over the local connection, the second communication session being distinct from the first communication session.

2. The method of claim 1, wherein:
    the method further comprises receiving, by the connected device, user authorization; and
    providing the update request is based on the user authorization.

3. The method of claim 1, wherein the mobile device is inferior to the connected device in at least one of processing power, memory, or power supply.

4. The method of claim 2, the method further comprising providing, by the connected device, a graphical user interface for managing updates to the mobile device, the graphical user interface enabling a user to authorize providing the update request to the application system.

5. The method of claim 2, wherein the user authorization is based on at least one of a PIN or password provided to a graphical user interface.

6. The method of claim 1, the method further comprising contacting, by the connected device, the mobile device to establish the second communication session with the mobile device.

7. The method of claim 1, wherein receiving the message from the application system comprises receiving an encrypted message from the application system and decrypting the encrypted message to generate the message.

8. The method of claim 7, wherein the message is encrypted with a key of the mobile device.

9. The method of claim 1, wherein the connected device retrieves updates intended for the mobile device.

10. The method of claim 1, wherein the connected device communicates with the mobile device via one of a radio wave connection, an infrared connection, or an induction-based connection.

11. The method of claim 1, wherein the connected device can communicate with the application system and the mobile device via at least one of Ethernet, cellular, or wireless connection capabilities.

12. The method of claim 1, wherein the connected device is a desktop, laptop, tablet, mobile phone, or wearable device.

13. A connected device for updating a mobile device, comprising:
    one or more memory units storing instructions;
    one or more processors for executing the instructions to perform operations comprising:
        receiving an update request in a first communication session with the mobile device using a local connection established over a local area network, a personal area network, or a near field communication network;
        providing the update request to an application system using a second connection distinct from the local connection established over a cellular network;
        receiving a message from the application system using the second connection in response to the update request, the message comprising an application for updating the mobile device and a token; and
        providing the message in a second communication session with the mobile device over the local connection, the second communication session distinct from the first communication session.

14. An application system for managing mobile device updates, comprising:
    one or more memory units storing instructions;
    one or more processors for executing the instructions to perform operations comprising:
        receiving, in a first communication session with a connected device, an application request using a local connection established over a local area network, a personal area network, or a near field communication network;
        providing a token request to a key system using the local connection;
        receiving a token from the key system using the local connection in response to the token request; and providing, in a second communication session with the connected device, the application request and the token over the local connection to update a mobile device.

15. The application system of claim 14, wherein the application system provides the application request to the connected device repeatedly.

16. The application system of claim 14, wherein the application request further comprises credentials for at least one of the mobile device or the connected device.

17. The application system of claim 14, wherein the application request comprises at least one of an applet or a firmware update.

18. The application system of claim 14, wherein the first token comprises a keyed hash or digital signature.

19. The application system of claim 14, wherein the first token comprises a timestamp.

* * * * *